INVENTOR:
ROBERT B. DOME,
BY Donald N. Timbie
HIS ATTORNEY.

INVENTOR:
ROBERT B. DOME,
BY Donald N. Timbie
HIS ATTORNEY.

INVENTOR:
ROBERT B. DOME,
BY Donald N. Timbie
HIS ATTORNEY.

INVENTOR:
ROBERT B. DOME,
BY Donald N. Timbie
HIS ATTORNEY.

INVENTOR:
ROBERT B. DOME,
BY Donald N. Timbie
HIS ATTORNEY.

3,219,759

SYSTEM FOR DEEMPHASIZING AND SEPARATING AMPLITUDE MODULATION COMPONENTS FROM A SIGNAL

Robert B. Dome, Geddes Township, Onondaga County, N.Y., assignor to General Electric Company, a corporation of New York Filed Oct. 31, 1960, Ser. No. 66,277
5 Claims. (Cl. 179—15)

This invention relates to a circuit for isolating two intelligence signals from a coded signal in which one combination of the intelligence signals appears in one portion of the frequency spectrum in preemphasized form, and in which amplitude modulation components produced by a different combination of the intelligence signals in preemphasized form lies in a different portion of the frequency spectrum. An important part of this circuit simultaneously performs the functions of isolating the amplitude modulation components, introducing deemphasis, inserting a carrier wave where required, detecting the combination of intelligence signals represented by the amplitude modulation components, and isolating the intelligence signals.

Isolation of the two intelligence signals from the coded signal by known techniques requires considerable components and is therefore expensive.

It is an object of this invention to provide a simple and relatively inexpensive circuit for isolating the two intelligence signals from the coded signal.

It is another object of this invention to provide a means for deemphasizing amplitude modulation components of a signal prior to detection.

It is still another object of this invention to provide means for simultaneously deemphasizing the amplitude modulation components and for separating them from signals that may appear in another portion of the spectrum.

It is still another object of the invention to provide means for simultaneously deemphasizing the amplitude modulation components, for separating them from signals in other positions of the frequency spectrum, and for injecting a carrier.

Briefly, these objectives may be attained in accordance with the invention in the following manner. A deemphasis circuit separates the combination of intelligence signals in the lower portion of the spectrum from the amplitude modulation components representing the other combination of the intelligence signals. A resonant circuit separates the amplitude modulation components and provides the desired deemphasis. If a carrier is to be inserted, it can be applied to the resonant circuit. The output of the resonant circuit is applied to an amplitude detector and its output is combined with that of the emphasis circuit in a special matrix so as to recover the individual intelligence signals.

Figure 1:
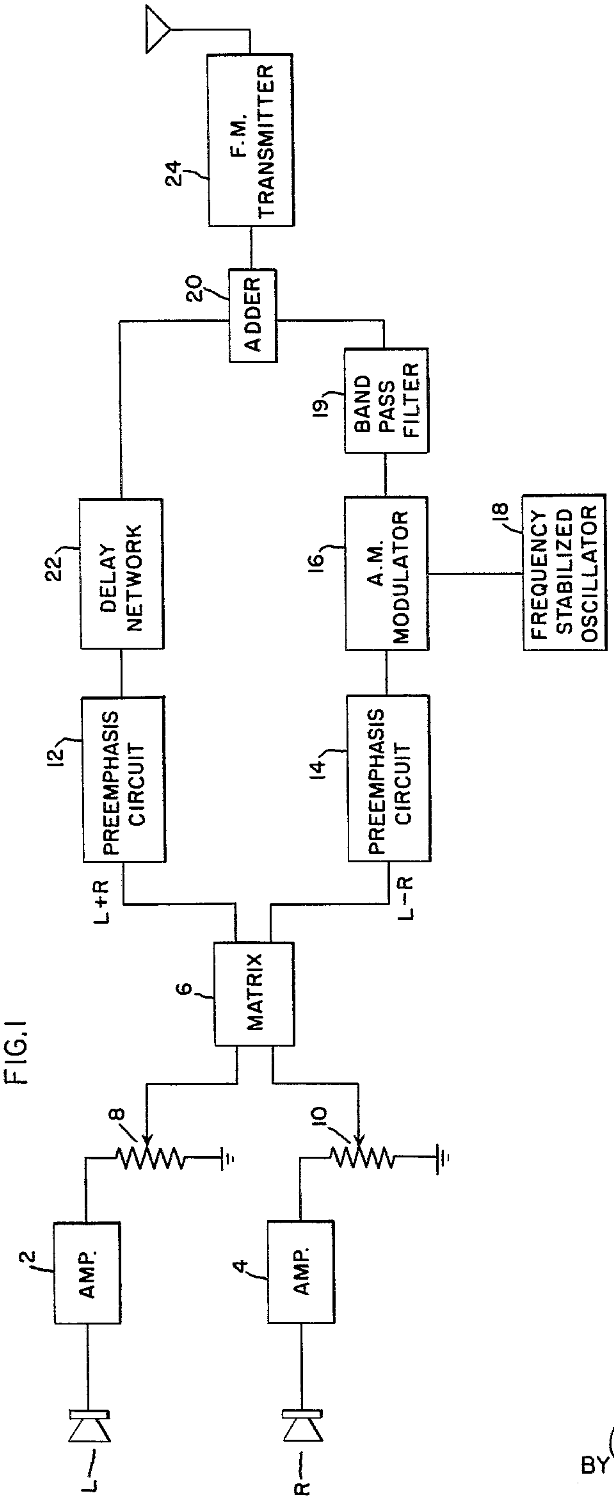

The manner in which the circuit of the invention operates will be clearly understood after the following discussion of the drawings in which:

FIGURE 1 is a block diagram of a frequency modulation transmitter illustrating one way in which stereophonic information may be coded and transmitted in a form to which the invented circuit is responsive.

Figure 1A:
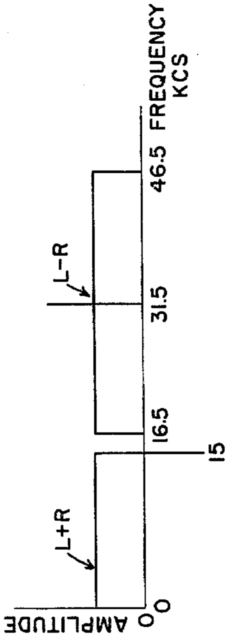
Figures 2, 3, 3A:
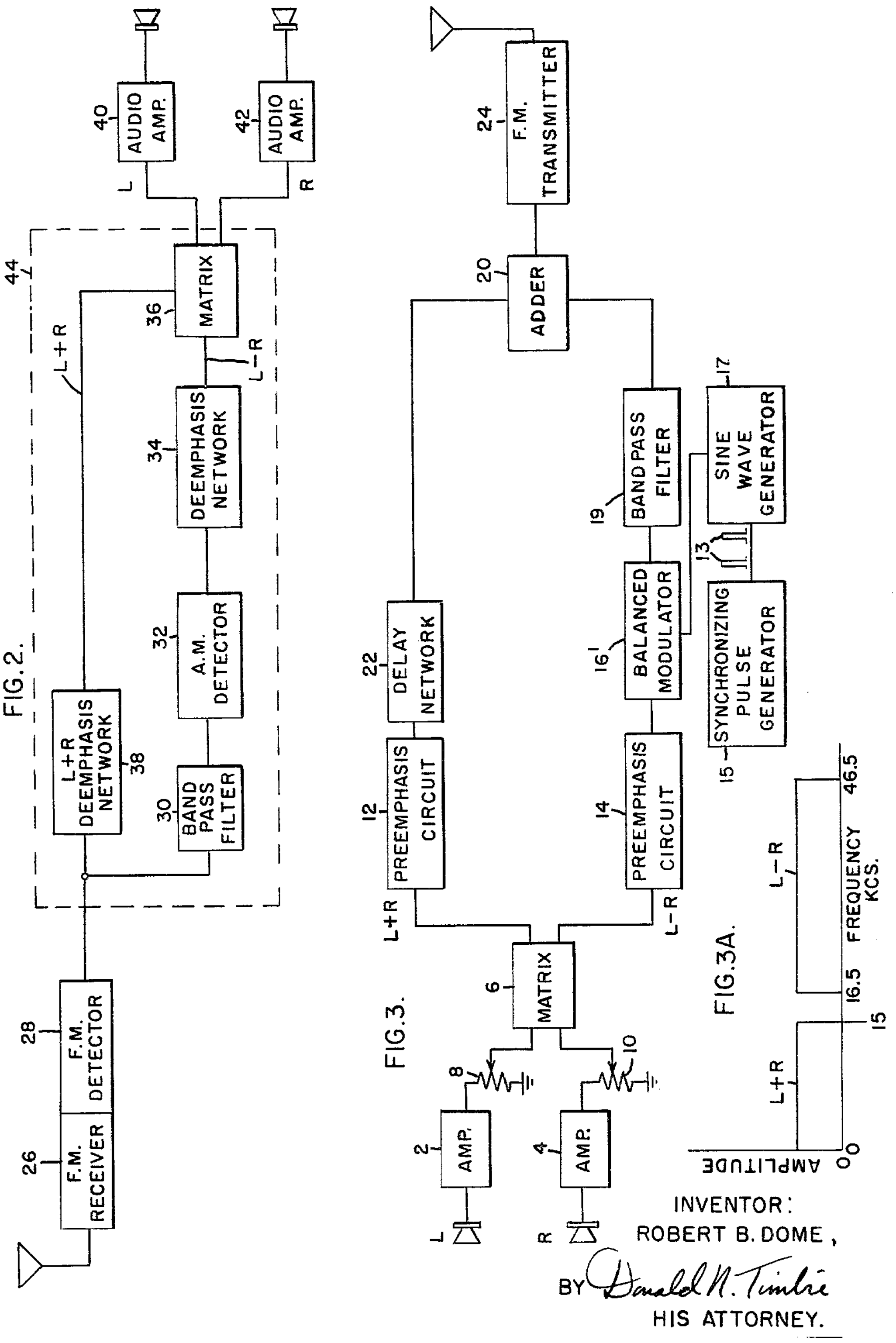
Figure 4:
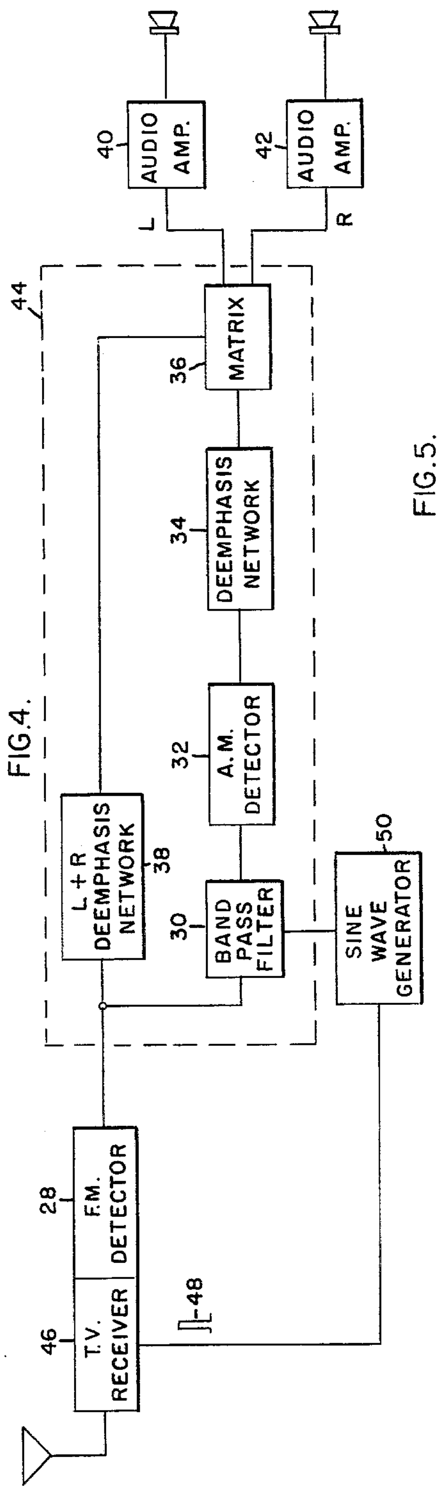
Figure 5:
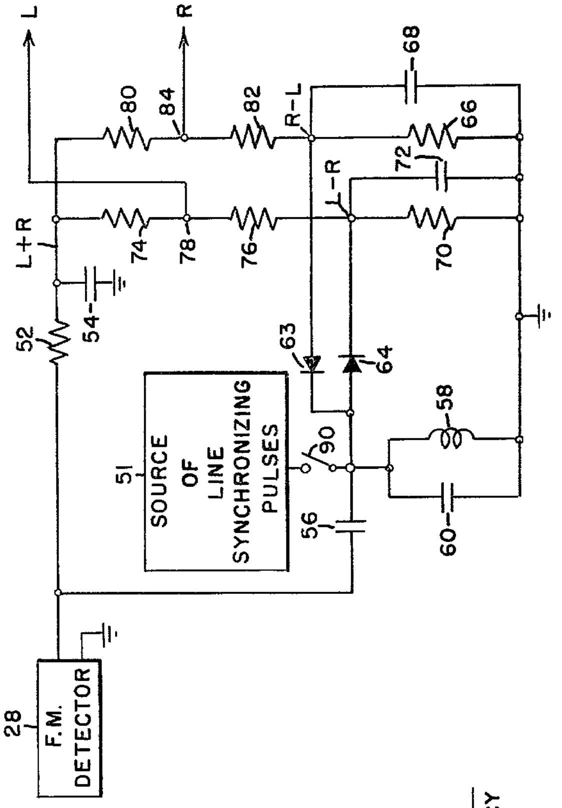
Figure 5A:
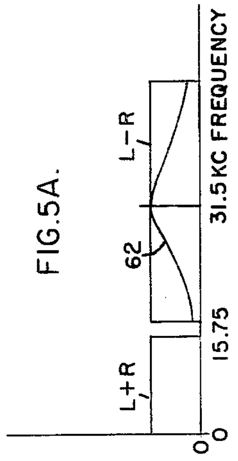

FIGURE 1A illustrates the frequency spectrum of the various intelligence signals in the transmitter of FIGURE 1, FIGURE 2 is a block diagram of a frequency modulation receiver illustrating the various functions that must be performed in order to decode the intelligence signals, FIGURE 3 is a block diagram of the audio portion of a television transmitter adapted to formulate and transmit audio signals of a type that the invented circuit is designed to decode, FIGURE 3A illustrates the frequency spectrum of the various intelligence signals in the transmitter of FIGURE 3, FIGURE 4 is a block diagram of the audio portion of a television receiver indicating the functions that are to be performed in decoding the intelligence signals with the circuit of this invention, FIGURES 5 through 9 are various forms of the circuit of this invention, and FIGURE 5A illustrates the frequency spectrum of the intelligence signals in FIGURES 5 through 9, and is used in explaining the operation thereof.

In order that the circuit of the invention may be more clearly understood various systems of a type in which it is useful will be described.

In FIGURE 1 microphones L and R pick up the audio information necessary for stereophonic operation. It is readily apparent that recordings could be substituted for the microphones. After amplification in amplifiers 2 and 4 respectively, suitable amounts of these signals are applied to a matrix 6 via potentiometers 8 and 10. The matrix 6 may be of any well known form capable of producing the sum of the signals L and R at one output and their difference at another output. In order to comply with present frequency modulation transmission standards, the signal $L+R$ is preemphasized in a circuit 12 and the signal $L-R$ is preemphasized in circuit 14. The output of the preemphasis circuit 14 is applied to an amplitude modulation modulator 16 so as to produce side bands about a carrier frequency furnished by a stabilized oscillator 18. A suitable spectrum of the side bands is selected by a band pass filter 19 and applied to an adder 20. Because of the additional delay introduced by the channel through which the $L-R$ signal passes, a delay network 22 is inserted between the output of the preemphasis circuit 12 and the adder 20. The output of the adder 20 is applied to any suitable frequency modulation transmitter 24.

The signals appearing at the output of the adder 20 may be represented by the graph shown in FIGURE 1A wherein the $L+R$ signal lies in the lower portion of the audio spectrum; in this particular case below the frequency of 15 kilocycles. The $L-R$ signal is represented by side bands that extend between 16½ kilocycles and 46½ kilocycles or in other words 15 kilocycles on either side of a carrier of 31½ kilocycles. It is to be understood that the output of the adder 20 may differ from that represented by FIGURE 1A and that this is therefore representative of only one form suitable for use in connection with this invention.

The signal transmitted by the transmitter 24 of FIGURE 1 is received by any suitable receiver 26 of FIGURE 2 and applied to any suitable frequency modulation detector 28. The output of the frequency modulation detector 28 will be a signal such as represented in FIGURE 1A. In order that the intelligence signals L and R be separated from one another, it is first necessary that the side bands representing the $L-R$ signal be separated from the remainder of the signal. This function is performed by a band pass filter 30 having cut off points at 16½ and 46½ kilocycles respectively. The $L-R$ signal is then detected by an amplitude modulation detector 32, deemphasized by deemphasis network 34 and applied to a matrix 36. The $L+R$ signal is separated from the $L-R$ side bands by a deemphasis network 38 and applied to the matrix 36. The matrix 36 operates in a well known manner to segregate the L and R signals and apply them to audio amplifiers 40 and 42 respectively. The circuit of this invention performs all of the functions performed by the blocks contained within the dotted rectangle 44.

FIGURE 3 illustrates in block diagram form the audio portion of a television transmitter adapted to formulate and transmit signals of a type to which the circuit of the present invention is responsive. For the purpose of convenience those portions of the diagram of FIGURE 3 carrying out the same or similar functions as components in FIGURE 1 are designated by the same numerals. It will be noted that the output of the amplitude modulation modulator 16 in FIGURE 1 contained the carrier. In the circuit of FIGURE 3 synchronizing pulses 13 are obtained from a synchronizing pulse generator 15 of the type usually found in a television transmitter and applied to a sine wave generator 17 that produces a second harmonic thereof. The output of the generator 17 is applied to an amplitude modulation modulator 16' that is designed in a manner well known to those skilled in the art to suppress the carrier. The resulting wave appearing at the output of the adder 20 is illustrated in FIGURE 3A and contains the $L+R$ signal in the portion of the spectrum lying below 15 kilocycles and the amplitude modulation sidebands of the $L-R$ signal between frequencies of 16½ and 46½ kilocycles.

FIGURE 4 illustrates the portion of the TV receiver adapted to decode the L and R signals from the signal such as represented by FIGURE 3A. For the purpose of convenience the blocks of FIGURE 4 corresponding in function to those of FIGURE 2 are designated by the same numerals. Instead of a frequency modulation receiver, a television receiver 46 is illustrated. In addition, synchronizing pulses 48 are derived from the televsion receiver 46 and applied to a generator 50 that produces the second harmonic of the fundamental frequency of the pulses 48, which in a standard television receiver is 31.5 kilocycles. Because this frequency is the same as the carrier frequency provided by the generator 17 of FIGURE 3 and suppressed by the modulator 16', it can be inserted as by coupling it into the filter 30 so as to take the place of the carrier.

Reference is now made to FIGURE 5 for an explanation of the manner in which the circuit of this invention performs the functions represented by the blocks contained within the dotted rectangle 44 of FIGURES 2 and 4. Assume that the signal at the output of the frequency modulation detector 28 is as indicated by FIGURE 1A, wherein the $L+R$ signal is below 15 kilocycles and the $L-R$ sidebands are centered about a carrier of 31.5 kilocycles.

The $L+R$ signal is segregated and deemphasized by a resistor 52 and a capacitor 54 connected in series across the output of the detector 28. The time constant of the resistor 52 and the capacitor 54 is the same as that of the preemphasis networks 12 of FIGURES 1 and 3 so that the $L+R$ signal is the same general form as at the output of the matrix 6.

A coupling capacitor 56 is connected between the output of the detector 28 and the ungrounded end of a parallel circuit comprised of an inductor 58 and a capacitor 60. The values of the inductor 58 and the capacitor 60 are chosen so as to produce maximum output at the carrier frequency of 31.5 kilocycles, and their design is such as to cause the overall circuit to have a Q that will deemphasize the sidebands as indicated in FIGURE 5A by the curve 62. In order to provide the deemphasis that just counteracts the preemphasis in the transmitter, the Q may be determined in the following manner. The preemphasis network 14 of FIGURES 1 and 3 provides a rising characteristic represented by the equation $$\frac{eo}{e_1}=\sqrt{1+\tau^2\omega^2}$$

where $\tau$ equals the preemphasis time constant, $\omega=2\pi f$ and $f=$ the audio frequency. The deemphasis characteristic should therefore be the inverse of the above equation or should be $$\frac{eo}{e_1}=\frac{1}{\sqrt{1+\tau^2\omega^2}}$$

Now a single shunt tuned circuit like 58, 60, when fed through an infinite impedance, will have a response represented by the following equation.

$$\frac{eo}{e_1}=\frac{1}{\sqrt{1+4Q^2\delta^2}}$$

where $$\delta=\frac{\text{frequency from resonance}}{\text{resonant frequency}}$$

(see "Television Principles," eq. 7–150, p. 191, R. B. Dome). Now $\delta$ may be written as $\omega/\omega_0$ where $\omega$ has the meaning of audio frequencies as used in the first equation above, while $\omega_0$ has the meaning of the carrier frequency (31.5 kilocycles in the particular example represented by FIGURE 1A). Accordingly, the preceding equation may be rewritten as follows.

$$\frac{eo}{e_1}=\frac{1}{\sqrt{\frac{1+4Q^2\omega^2}{\omega_0^2}}}$$

It can now be seen that this last equation resembles the second equation above and that it would be identical thereto if $$\frac{4Q^2}{\omega_0^2}=\tau^2 \text{ or } Q=\frac{\omega_0\tau}{2}$$

In a system where the time constant $\tau$ of the preemphasis network 14 is $75\text{X}10^{-6}$ seconds and where the carrier frequency is 31500, the Q of the parallel circuit 58, 60 should be represented by the expression $$\frac{2\pi\times31.5\times1000\times75\times10^{-6}}{2}$$

which reduces to 7.44. In any system a similar calculation can be made and the resulting Q of the overall circuit depends on the time constant of the preemphasis network in the transmitter and the frequency of the carrier. Hence the parallel overall circuit including 58, 60 provides the proper deemphasis, and also by virtue of the fact that the transmission at 15 kc. is attenuated, the $L+R$ signal is not passed.

The deemphasized sidebands as indicated by the curve 62 of FIGURE 5A appear across the parallel network 58, 60 and are applied to oppositely poled rectifier 63, 64. The output of the rectifier 63 is connected to a load circuit comprised of a resistor 66 in parallel with a capacitor 68, the values of which are so chosen as to provided a satisfactory output at the highest audio frequency (15 kc. in the assumed example) and yet have a small output for the carrier frequency (31.5 kc. in the assumed example). The output of the rectifier 64 is connected to a load circuit comprised of a resistor 70 in parallel with a capacitor 72, the values of which are similar to the resistor 66 and the capacitor 68 respectively.

Because of the respective polarities of the rectifiers 63, 64, and detected signal across the load circuit 66, 68 is $R-L$ and the detected signal across the load circuit 70, 72 is $L-R$.

In order to isolate the L signal, the $L+R$ signal appearing across the capacitor 54 is applied to one end of a resistor 74 and the $L-R$ signal developed across the load circuit 70, 72 is applied to one end of a resistor 76, and the resistors 74, 76 are connected in series. With such a configuration the potential at any point on the resistors 74, 76 varies as L varies so that the signal L appears at a tap 78 between them. On the other hand, when the R signal increases the potential at the upper end of resistor 74, the potential at the lower end of the resistor 76 is decreased by the —R signal with the result that there will be a point along the resistors 74, 76 where the net change in voltage is zero. If the R signal and the —R signal have the same amplitude, the point of zero potential may be made to occur at the tap 78 if the values of the resistors 74, 76 are the same. If for some reason the R and the —R signals should not be of the same amplitude, the relative values of the resistors 74, 76 could be adjusted so as to produce no R signal at the tap 78. Hence only the L signal appears at the tap 78.

The R signal is isolated in a similar manner by the resistors 80, 82 in series between the ungrounded side of the capacitor 54 and the ungrounded side of the load circuit 66, 68. Because the R signal is applied to opposite ends of the resistors 80, 82, the voltage at any point along them will vary in accordance with the R signal and therefore appear at the tap 84. The polarities of the L signal applied at the upper and lower ends of the resistors 80, 82 are opposite so that there is some point along the resistors where they cancel to produce zero voltage corresponding to the L signal. If L and —L are of equal amplitude, the point occurs at the tap 84 if the resistors 80, 82 have equal value. If L and —L are unequal in amplitude, the relative values of the resistors 80, 82 can be selected so that the L and —L signals cancel at the tap 84. Hence, only the R signal appears at the tap 84.

The above discussion relates to the circuit of this invention as it would be used in the receiver of a system wherein the carrier is transmitted with the sidebands of the $L-R$ signal, as for example in a frequency modulation system illustrated in FIGURES 1 and 2. One of the distinct advantages of the circuit of this invention is that it may also be used with a system wherein the carrier is not transmitted with the sidebands of the $L-R$ signal, as for example, in the audio portion of a television system illustrated in FIGURES 3 and 4. The carrier may be reconstituted by applying the line synchronizing pulses from a source 51 to the ungrounded end of the circuit 58, 60 via a switch 90.

Figure 6:
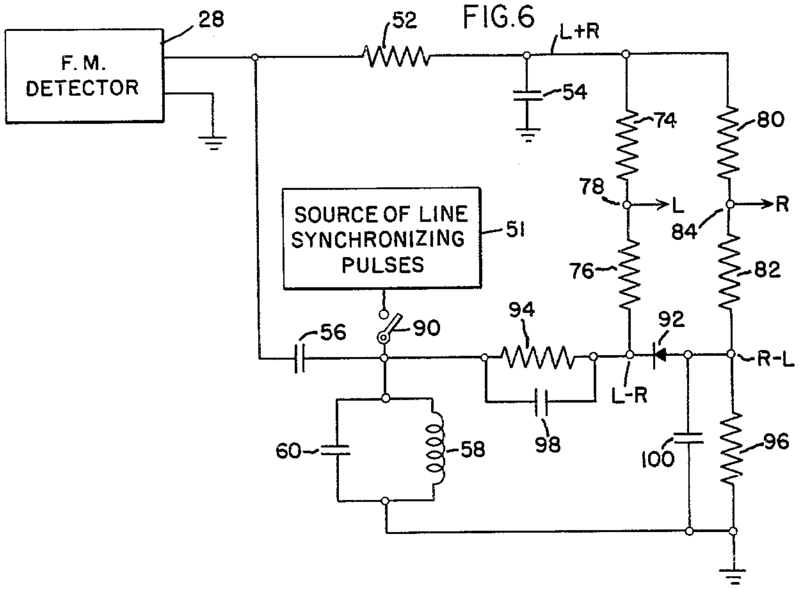

Reference is now made to FIGURE 6 wherein another form of the circuit of this invention is illustrated. For convenience those parts that correspond to parts of the circuit of FIGURE 5 are designated by the same numerals. It will be observed that the circuits of FIGURES 5 and 6 are similar except for the fact that the diodes 63 and 64 of FIGURE 5 are replaced by a single diode 92. The load for the diode consists of two resistors 94 and 96, the resistor 94 being connected between the ungrounded end of the shunt circuit 58, 60 and one terminal of the diode 92, the resistor 96 being connected between the other terminal of the diode 92 and ground. Capacitors 98 and 100 bypass the subcarrier frequency around the resistors 94 and 96 respectively. With this arrangement, a signal $L-R$ is developed across the resistor 94 and is applied to the lower end of the resistor 76, and a signal $R-L$ is developed across the resistor 96 and is applied to the lower end of the resistor 82. These signals operate to produce L and R signals at the taps 78 and 84 in the same manner as in circuit of FIGURE 5.

Figure 7:
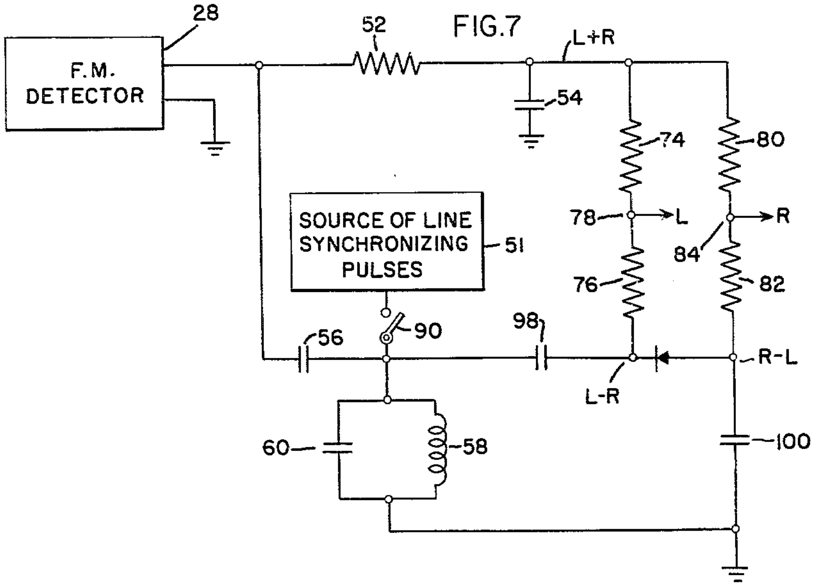

Reference is now made to FIGURE 7 which is a schematic diagram of another form of the circuit of this invention. For convenience those components that correspond to components of the circuits of FIGURES 5 and 6 are designated by the same numerals. It will be observed that the circuit of FIGURE 7 is the same as the circuit of FIGURE 6 except for the fact that the diode load resistors 94 and 96 are omitted. Their function is performed by the matrix resistors 74, 76 and 80, 82.

Figure 8:
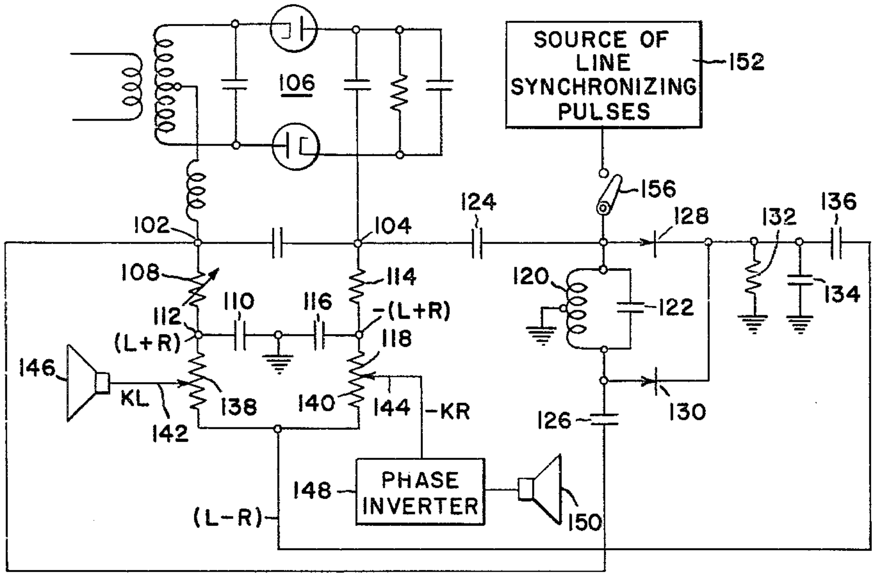

FIGURE 8 illustrates another way of recovering the R and L signals from a transmitted signal of the type illustrated in FIGURE 1A. Any suitable frequency modulation detector may be used to detect the signals of FIGURE 1A with opposite polarities and apply them to terminals 102, 104. In the particular circuit shown these out of phase voltages are derived by a well known ratio detector generally indicated by the numeral 106 A deemphasis network comprised of a resistor 108 and a capacitor 110 provides the $L+R$ signal at their junction 112. Similarly a deemphasis network comprised of a resistor 114 and a capacitor 116 provides at their junction 118 a $-(L+R)$ signal. An $(L-R)$ signal is derived by coupling a parallel shunt circuit comprised of an inductance 120, grounded at its center, and a capacitor 122 between the terminals 102, 104 via capacitors 124, 126. This shunt circuit operates in a manner similar to the shunt circuits 58, 60 of FIGURES 5, 6 and 7 to separate the $L-R$ sidebands and provide the desired amount of deemphasis. Unilateral conducting devices 128, 130 are connected from opposite ends of the shunt circuit 120, 122 to a load circuit comprised of a resistor 132 and a capacitor 134 connected in parallel. The $L-R$ signal derived by this push pull detector is coupled via a capacitor 136 to ends of potentiometers 138, 140, the other ends ends being connected to the points 112 and 118 at which the signals $L+R$ and $-(L+R)$ respectively appear. A moveable contact 142 on the potentiometer 138 can be adjusted to the balance point of the +R and —R signals so as to produce a signal KL where K is a constant, and a moveable contact 144 on the potentiometer 140 can be adjusted to the balance point of the +L and —L signals so as to produce a signal —KR where K is a constant. The signal KL may be applied directly to an acoustic transducer 146, and the signal —KR may be applied to a phase inverter 148 so as to produce a signal KR which may then be applied to an acoustic transducer 150. The phase inversion is most simply effected by interchanging the connections to the voice coil of the transducer.

If the transmited signal is of the form illustrated by FIGURE 3A, i.e., without a carrier for the $L-R$ signal, the carrier can be reconstituted by coupling a source 152 to the shunt circuit 120, 122 via a switch 156.

Figure 9:
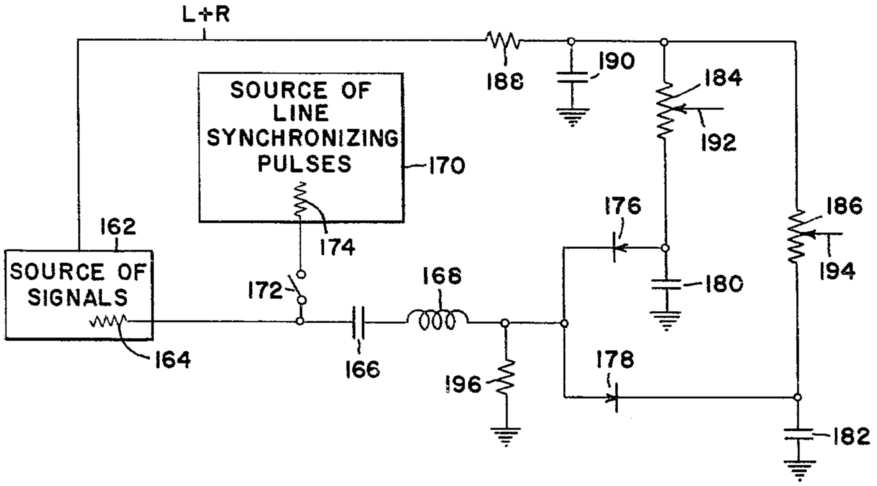

FIGURE 9 illustrates another way of providing deemphasis of the $L-R$ sidebands and maximization of the detected output. A source of signals 162, which could be a frequency modulation detector, and which has an internal impedance represented by a resistor 164 is connected to a series circuit comprised of a capacitor 166 and an inductor 168. In a television system in which the subcarrier is repressed and must therefore be regenerated, the regeneration may be effected by connecting a source 170 of pulses of the line scanning frquency to the capacitor 176 via a switch 172. The internal impedance of the source 170 is represented by a resistor 174. As in the other circuits illustrated, the pulses provided by the source 170 could be line synchronizing pulses or flyback pulses derived in any well known manner from the line deflection transformer (not shown) present in practically all receivers.

The other end of the series circuit 166, 168 is connected to oppositely poled unilateral conducting devices 176, 178. The bypass capacitors 180 and 182, the matrixing resistors 184 and 186 and the $L+R$ deemphasis network comprised of a resistor 188 and a capacitor 190 operate in a manner previously explained to provide an L signal at the contact 192 and an R signal at the contact 194. The overall Q of the circuit could be established at a proper value by selecting the appropriate load resistances in the amplitude modulation detector circuits, but as this may in some cases present practical difficulties, it may be better to use a resistor 196 connected between the output of the series circuit 166, 168 and ground. Other means for establishing the desired Q could be employed. Because the series circuit 166, 168 lowers the impedance of the overall circuit for the subcarrier frequency, this frequency produces a maximum output at the contacts 192, 194.

Accordingly, both the series circuit 166, 168 or the shunt circuit 58, 60, constitute means for tuning the overall circuit involving the $L-R$ signal, including the output impedances of any source such as the frequency modulation detector, and, if used, the output impedance of the source of line frequency pulses, as well as the input impedance of the amplitude modulation detection means in such manner as to maximize the energy applied to the amplitude modulation detector at the subcarrier frequency and to deemphasize the sidebands.

What is claimed is:

1. In a receiver for use in a stereophonic sound transmission system in which the transmitted intelligence is comprised of a preemphasized $L+R$ signal allocated to the portion of the spectrum below a predetermined frequency and amplitude modulation sidebands of a carrier wave representing a preemphasized $L-R$ signal the sidebands being allocated to a different portion of the spectrum, the combination of a source of the $L+R$ signal and the sidebands representing the preemphasized $L-R$ signal, a deemphasizing circuit coupled to said source, said deemphasizing circuit having a transfer characteristic that falls off as the frequency increases, said transfer characteristic being such as to offset the preemphasis of said $L+R$ signal and to prevent the $L-R$ sidebands from passing through said deemphasizing circuit, an amplitude modulation detection means having an input and an output, means for coupling said source to said input of said amplitude modulation detection means, said coupling means having a transfer characteristic which is a maximum at the frequency of said carrier wave and which falls off on either side in such manner as to offset the preemphasis of said $L-R$ sidebands so that the amplitude modulation detection means produces an $L-R$ signal in its original form, and matrixing means coupled to said deemphasizing circuit and said output of said amplitude modulation detection means, said matrixing means being such as to combine the $L+R$ and $L-R$ signals so as to produce segregated L and R signals.

2. In a communication receiver of the type suitable for receiving first and second stereophonically related intelligence signals, said related intelligence signals having been combined during transmission to form first and second combination intelligence signals, said first combination intelligence signal having been encoded during transmission by amplitude modulating a carrier signal with said first combination intelligence signal to produce sidebands thereof, said sidebands having a preemphasized characteristic, a detector circuit for detecting said stereophonically related intelligence signals comprising: a source of said first encoded combination intelligence signal and said second combination intelligence signal, means separating said second combination signal from said first combination signal, amplitude detection means, means for coupling said encoded first combination intelligence signal to said amplitude detection means, said coupling means having a transfer characteristic that deemphasizes said sidebands of said first combination intelligence signal, said amplitude detection means arranged for simultaneously providing as output signals said first combination intelligence signal and said first combination intelligence signal in inverted form, means for combining said detected first combination intelligence signal and said separated second combination intelligence signal to form said first stereophonically related intelligence signal, and means for combining said detected first combination intelligence signal in inverted form and said separated second combination intelligence signal to form said second stereophonically related intelligence signal.

3. The combination as defined in claim 1 wherein said coupling means comprises resonant circuit means.

4. The combination as defined in claim 3 wherein said resonant circuit means is resonant at said carrier frequency and the Q of said resonant circuit means is adjusted to vary with the frequency deviation from the frequency of the carrier wave in a reciprocal manner to said preemphasis of said signal.

5. The combination as defined in claim 3 wherein means are provided for coupling a signal at said carrier wave frequency into said resonant circuit means.

References Cited by the Examiner

UNITED STATES PATENTS

| | | | |
|---|---|---|---|
| 2,285,085 | 6/1942 | Hagen | 325—65 |
| 2,698,379 | 12/1954 | Boelens | 179—15 |
| 2,709,254 | 5/1955 | Halstead | 179—15 |
| 2,729,702 | 1/1956 | Richman | 178—69.5 |
| 2,838,606 | 6/1958 | Adler | 178—69.5 |
| 2,851,532 | 9/1958 | Crosby | 179—15 |
| 2,917,623 | 12/1959 | Crosby | 179—15 |
| 2,921,981 | 1/1960 | Kidd | 179—15 |
| 2,986,597 | 5/1961 | Teer | 179—15.55 |
| 2,996,571 | 8/1961 | Nero | 332—37 |
| 3,059,189 | 10/1962 | Preisig | 179—15 |
| 3,068,475 | 12/1962 | Avins | 179—15 |
| 3,087,994 | 4/1963 | Schutte | 179—15 |
| 3,133,993 | 5/1964 | De Vries | 179—155 |

OTHER REFERENCES

Electronics, April 3, 1959, pp. 41–46.

DAVID G. REDINBAUGH, *Primary Examiner.*

L. MILLER ANDRUS, ROBERT H. ROSE, *Examiners.*